(12) United States Patent
Walter et al.

(10) Patent No.: US 6,686,037 B2
(45) Date of Patent: Feb. 3, 2004

(54) WOOD VENEER COMPRISING ETHYLENE STYRENE INTERPOLYMER LAYER AND PROCESS FOR PRODUCING THE SAME

(75) Inventors: Thomas Walter, Oldenburg (DE); Maximilian Zaher, Oldenburg (DE)

(73) Assignee: Bush Industries, Inc., Jamestown, NY (US)

( * ) Notice: Subject to any disclaimer, the term of this patent is extended or adjusted under 35 U.S.C. 154(b) by 0 days.

(21) Appl. No.: 09/464,242

(22) Filed: Dec. 16, 1999

(65) Prior Publication Data

US 2003/0129432 A1 Jul. 10, 2003

(30) Foreign Application Priority Data

Dec. 17, 1998 (EP) .............................. 98124243

(51) Int. Cl.$^7$ ..................... B32B 21/08; B29C 47/02
(52) U.S. Cl. .................. 428/337; 428/332; 428/507; 428/511; 428/512; 428/513; 156/244.11; 156/244.27; 156/272.2; 156/334
(58) Field of Search ............... 428/507, 511, 428/512, 513, 332, 337, 220; 427/372.2, 394, 397, 408; 156/334, 272.2, 244.11, 244.27

(56) References Cited

U.S. PATENT DOCUMENTS

| | | | |
|---|---|---|---|
| 3,480,506 A | 11/1969 | Hart et al. ................. 161/165 |
| 3,803,034 A | * 4/1974 | Dasch ........................ 508/472 |
| 3,936,551 A | * 2/1976 | Elmendorf et al. ........... 428/50 |
| 4,533,589 A | * 8/1985 | Sewell ....................... 428/174 |
| 4,695,390 A | * 9/1987 | Koch et al. ................. 508/221 |
| 4,759,983 A | * 7/1988 | Knutson et al. ............ 428/343 |
| 5,187,000 A | * 2/1993 | Chow et al. ................ 428/141 |
| 6,254,956 B1 | * 7/2001 | Kjellqvist et al. ........... 428/44 |
| 6,344,515 B1 | * 2/2002 | Parikh et al. ............... 524/578 |
| 6,420,475 B1 | * 7/2002 | Chen ......................... 524/505 |

FOREIGN PATENT DOCUMENTS

| | | |
|---|---|---|
| DE | 1944336 | 3/1971 |
| DE | 0203275 | 10/1983 |
| JP | 58059836 | 4/1983 |
| JP | 60187533 | 9/1985 |
| JP | 63118247 | 5/1988 |
| JP | 63118248 | 5/1988 |
| JP | 03278904 | 10/1991 |
| WO | WO 98/10160 | * 3/1998 |

* cited by examiner

Primary Examiner—Monique R. Jackson
(74) Attorney, Agent, or Firm—Webb Ziesenheim Logsdon Orkin & Hanson, P.C.

(57) ABSTRACT

A process for producing a veneer is disclosed wherein a layer made from a polyolefin, a copolymeric polyolefin or both is applied to a veneer sheet using heat and/or pressure. A veneer produced using this process is also disclosed.

6 Claims, 1 Drawing Sheet

WOOD VENEER COMPRISING ETHYLENE STYRENE INTERPOLYMER LAYER AND PROCESS FOR PRODUCING THE SAME

BACKGROUND OF THE INVENTION

1. Field of the Invention

The invention relates to a process for producing a veneer and to a product produced in this way.

2. Description of the Related Art

In order to restrain as far as possible the use of high-value timbers, it is nowadays usual to cover the surfaces of a wide variety of articles, e.g. of furniture, with wood veneer.

The object of the invention is to provide a veneer which makes operations easy and cost-effective, retains the aesthetic impression of the high-quality timber and can accept chemical and physical stresses.

BRIEF SUMMARY OF THE INVENTION

The novel process for producing a veneer of this type comprises the steps of
- a) applying to a veneer sheet a layer made from the group consisting of a polyolefin, a copolymeric polyolefin and a mixture of polyolefin and copolymeric polyolefin and
- b) bonding to one another the veneer sheet and the material of the layer.

A veneer sheet is therefore to be understood here as a conventional veneer made from timber, e.g. from a high-value timber. The product produced according to the invention, i.e. the veneer in the sense of this application, is then the veneer sheet processed in the manner described above, i.e. a product in which the wood veneer sheet has been penetrated by the above-mentioned polyolefins or copolymeric polyolefins, etc.

This gives a veneer which has significantly better shapeability than conventional veneer sheets. This opens up a broad range of applications for veneers and also allows dramatic simplification of operations with veneers compared with the prior art.

Preference is given to application by pressure in step (b) at pressures of from 5 to 20 bar. Temperatures preferred for the application by pressure are in the range from 150 to 200° C.

A particularly preferred embodiment of the invention provides that ESI is used as the layer which, with pressure and/or heat, penetrates the wood veneer sheet. ESI is an ethylene-styrene interpolymer supplied by Dow Chemical under this name. It is a copolymeric polyolefin. Its properties with respect to the present invention are in particular very good adhesive bonding performance (with pressure and temperature), good shapeability, good capability for decoration by the "release" method and good coatability.

Further preferred embodiments of the invention are described in the dependent claims.

A particularly preferred embodiment of the invention provides that the layer to be applied by pressure to the wood veneer sheet has at least two sublayers with different proportions of ethylene and styrene, where the sublayer initially facing the wood comprises more ethylene than does the sublayer initially facing away from the wood.

A veneer produced according to the invention is preferably further processed by being clamped, in the final shape (structure) desired, into an injection moulding machine and being back-moulded with plastic in a manner known per se. This gives a stable high-quality product with a surface which is of high quality and which is in particular aesthetically attractive. The surface has good coatability and capability for decoration.

BRIEF DESCRIPTION OF THE DRAWINGS

The invention is described below by way of example, using the drawing. This shows.

DETAILED DESCRIPTION OF THE INVENTION

A veneer sheet 10 is firstly prepared from timber.

A layer 12 is applied to the wood veneer sheet 10. The layer 12 is composed, for example, of a polyolefin and/or of a copolymeric polyolefin or of a mixture comprising at least one of these constituents.

The material ESI is preferred for the layer 12, that is to say an ethylene-styrene interpolymer (supplied as ESI by Dow Chemical). The advantageous properties of this material have been mentioned above.

Depending on the use intended, the thickness of the wood veneer sheet 10 is, for example, in the range from 200 $\mu$m to 1 mm.

The thickness of the layer 12 applied, made from ESI for example, is preferably from 20 to 200 $\mu$m, depending on the thickness and the desired properties of the veneer to be produced.

The layer 12 is then applied by pressure to the veneer sheet 10, whereupon the material of the layer 12 penetrates into the porous wood of the veneer sheet 10. The pressures used may be in the range from 5 to 20 bar. The temperatures which prevail are preferably in the range from 150 to 200° C.

This gives a veneer which is easy to shape and has good mechanical, physical and chemical properties.

Figure 1:
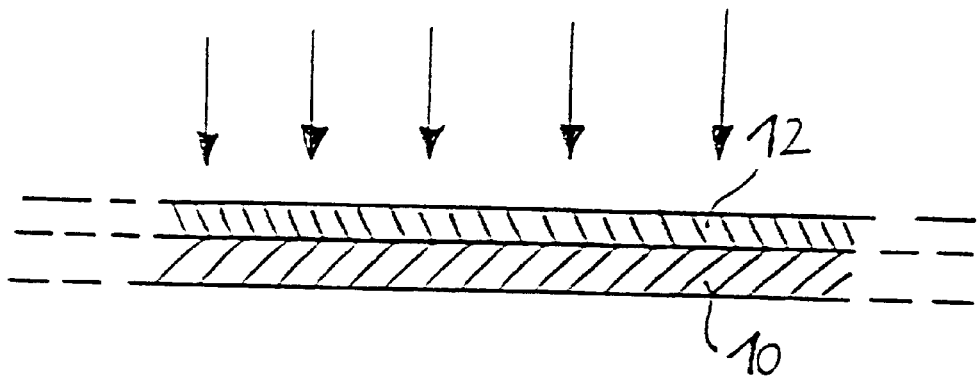
FIG. 1 is a diagram illustrating the novel process using a veneer sheet and a layer lying thereupon.
Figure 2:
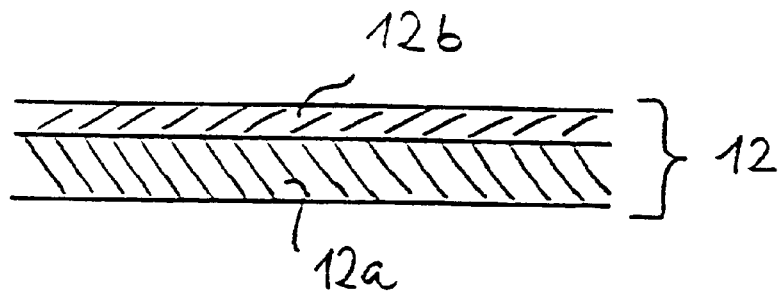
FIG. 2 is a diagram of a preferred working example of the polyolefin layer to be processed.

FIG. 2 shows a particular embodiment of the layer 12 for use with a wood veneer sheet 10 as in FIG. 1 (the wood veneer sheet 10 is not shown again in FIG. 2). The layer 12 as in FIG. 2 is composed of two sublayers 12a and 12b. ESI is the material intended for both layers. The lower sublayer 12a of the layer 12 comprises more ethylene than does the upper sublayer 12b. During further processing of the layer 12, the lower sublayer 12a is undermost when applied to the wood veneer sheet 10. When pressure and temperature are applied, as described above, the ethylene then penetrates more effectively into the porous wood material of the veneer sheet 10. The higher styrene concentration in the upper sublayer 12b gives the resultant veneer better surface properties.

The two layers 12a and 12b may be extruded, for example, by a coextrusion process know per se.

Figure 3:
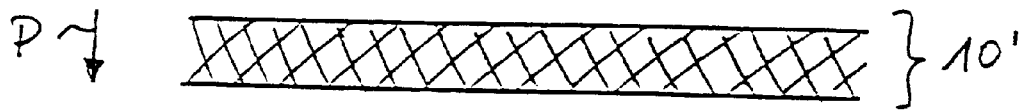
FIG. 3 is a diagram of a veneer produced according to the invention.

FIG. 3 illustrates diagrammatically the veneer 10' produced in this way, i.e. the veneer sheet 10 with the polyolefins or copolymeric polyolefins, in particular ESI, or mixtures of these, which have penetrated the veneer sheet. The layer 12 does not have to penetrate completely homogeneously into the veneer sheet 10. It is perfectly acceptable for there to be a concentration gradient in the final product in the direction of the arrow P in FIG. 3. This applies in particular if the layer 12 used has a number of sublayers and different components which intentionally differ in their penetration into the wood material.

The invention has been described with reference to preferred embodiments which are merely illustrative of the present invention and not restrictive thereof. Obvious modifications and alterations of the present invention may be made without departing from the spirit and scope of the present invention. The scope of the present invention is defined by the appended claims and equivalents thereto.

We claim:

1. A process for producing a veneer comprising the steps of:
   (a) applying to a wood veneer sheet a layer comprising ethylene-styrene interpolymer produced by a constrained geometry catalyst, wherein the layer is comprised of at least two sublayers and each sublayer has a different proportion of ethylene and styrene, and
   (b) applying a pressure between 5 and 20 bars and temperatures between 150 and 200 degrees Centigrade to said applied layer such that said layer of ethylene-styrene interpolymer penetrates into the wood to obtain a veneer comprising improved shapeability as compared to the wood veneer sheet.

2. The process according to claim 1 wherein the layer is comprised of at least a first sublayer and a second sublayer wherein the first sublayer contacts the veneer sheet and has more ethylene than does the second sublayer.

3. The process according to claim 1 wherein the thickness of the layer is between 20 to 200 micrometers.

4. The process according to claim 1 wherein the thickness of the veneer is between 200 micrometers to 1 millimeter.

5. A veneer composite produced according to the process of claim 1.

6. A veneer composite comprised of:
   (a) a veneer sheet made of wood; and
   (b) a layer comprising an ethylene-styrene interpolymer, wherein the layer is comprised of at least two sublayers and each sublayer has a different proportion of ethylene and styrene, and wherein the layer penetrates into the veneer sheet.

* * * * *

UNITED STATES PATENT AND TRADEMARK OFFICE
CERTIFICATE OF CORRECTION

PATENT NO. : 6,686,037 B2
DATED : February 3, 2004
INVENTOR(S) : Walter et al.

It is certified that error appears in the above-identified patent and that said Letters Patent is hereby corrected as shown below:

Title page,
Item [*] Notice, before "Subject to any disclaimer…" insert as a separate paragraph
-- This patent issued on a continued prosecution application filed under 37 CFR 1.53 (d), and is subject to the twenty year patent term provisions of 35 U.S.C. 154(a)(2). --.
Item [57] ABSTRACT,
Lines 1-4 delete: "A process for producing a veneer is disclosed wherein a layer made from a polyolefin, a copolymeric polyolefin or both is applied to a veneer sheet using heat and/or pressure. A veneer produced using this process is also disclosed."should read -- A process for producing a wood veneer is disclosed wherein a layer made from a polyolefin, a copolymeric polyolefin or both is applied to a wood veneer sheet using heat and/or pressure. The polyolefin layer is preferably an ethylene-styrene interpolymer produced by a constrained geometry catalyst, and comprises at least two sublayers with each sublayer having a different proportion of ethylene and styrene. A wood veneer produced using this process is also disclosed. --

Column 4,
Line 16, "interpolymer" should read -- interpolymer produced by a constrained geometry catalyst --.

Signed and Sealed this

Tenth Day of August, 2004

JON W. DUDAS
*Acting Director of the United States Patent and Trademark Office*